(12) United States Patent
Baggio

(10) Patent No.: US 12,165,159 B2
(45) Date of Patent: Dec. 10, 2024

(54) SYSTEM AND COMPUTER PROGRAM FOR THE MANAGEMENT OF OBJECTS

(71) Applicant: BAGGIO GIOVANNI, San Giorgio in Bosco (IT)

(72) Inventor: Giovanni Baggio, San Giorgio in Bosco (IT)

(73) Assignee: VTCG S.R.L., Cittadella (IT)

( * ) Notice: Subject to any disclaimer, the term of this patent is extended or adjusted under 35 U.S.C. 154(b) by 216 days.

(21) Appl. No.: 17/640,059

(22) PCT Filed: Oct. 9, 2020

(86) PCT No.: PCT/EP2020/078397
§ 371 (c)(1),
(2) Date: Mar. 3, 2022

(87) PCT Pub. No.: WO2021/074026
PCT Pub. Date: Apr. 22, 2021

(65) Prior Publication Data
US 2022/0335444 A1    Oct. 20, 2022

(30) Foreign Application Priority Data

Oct. 16, 2019  (IT) .......................... 102019000018992
Nov. 6, 2019   (IT) .......................... 102019000020442
Feb. 12, 2020  (IT) .......................... 102020000002728

(51) Int. Cl.
*G06Q 30/018* (2023.01)
*G06K 7/10* (2006.01)
*G06K 19/07* (2006.01)

(52) U.S. Cl.
CPC ..... *G06Q 30/0185* (2013.01); *G06K 7/10297* (2013.01); *G06K 7/10366* (2013.01); *G06K 19/0723* (2013.01)

(58) Field of Classification Search
None
See application file for complete search history.

(56) References Cited

U.S. PATENT DOCUMENTS 9,856,678 B2 *  1/2018  Yang .................. G08B 13/2434
10,112,754 B2 * 10/2018  Roucou ................. B65D 41/62
(Continued)

FOREIGN PATENT DOCUMENTS

BR     102014004206 A2    12/2015
CA        3068988 A1 *     1/2019  ................ B01L 3/54
(Continued)

OTHER PUBLICATIONS

International Search Report issued Nov. 11, 2020 re: Application No. PCT/EP2020/078397, pp. 1-4, citing: EP 2 759 975 A1, CN 206 961 156 U, CN 206 691 636 U, CN 107 316 075 A, WO 2018/011536 A1, EP 3 190 064 A1, US 2016/063830 A1 and US 2015/242842 A1.
(Continued)

*Primary Examiner* — Fekadeselassie Girma
(74) *Attorney, Agent, or Firm* — CANTOR COLBURN LLP

(57) ABSTRACT

A system for management of at least one object, which includes
at least one container for containing the at least one object, the container having an element for the identification of the at least one object,
a control element. The system further includes
an element for reading the identification element, connected and/or connectable to control element,
and an interface for the entry and/or updating of data which is connected and/or connectable to a control element.

18 Claims, 3 Drawing Sheets

(56) References Cited

U.S. PATENT DOCUMENTS

| | | | |
|---|---|---|---|
| 10,204,296 B2* | 2/2019 | Clere | G06K 19/07798 |
| 2005/0253704 A1* | 11/2005 | Neuwirth | G06Q 10/087 340/8.1 |
| 2005/0253725 A1* | 11/2005 | Neuwirth | G08B 13/2457 340/572.7 |
| 2005/0258937 A1* | 11/2005 | Neuwirth | H04B 1/04 340/539.13 |
| 2005/0258956 A1* | 11/2005 | Neuwirth | G06Q 10/087 340/8.1 |
| 2006/0219776 A1* | 10/2006 | Finn | G06K 7/0043 235/380 |
| 2015/0242842 A1* | 8/2015 | Piva | G06Q 20/3278 340/572.1 |
| 2015/0269472 A1* | 9/2015 | Finn | H01Q 7/00 343/870 |
| 2015/0269474 A1* | 9/2015 | Finn | B23K 26/40 216/13 |
| 2015/0278675 A1* | 10/2015 | Finn | G06K 19/07783 29/601 |
| 2015/0310322 A1* | 10/2015 | Lamb | G06K 19/07718 29/527.2 |
| 2016/0063830 A1* | 3/2016 | Glamuzina, Jr. | G08B 13/128 340/572.1 |
| 2017/0001080 A1* | 1/2017 | Komatsu | A63B 37/007 |
| 2017/0123554 A1* | 5/2017 | Villar | G06F 3/0445 |
| 2017/0123561 A1* | 5/2017 | Saul | H01Q 1/2258 |
| 2017/0123563 A1* | 5/2017 | Saul | G06F 3/04166 |

FOREIGN PATENT DOCUMENTS

| | | | | |
|---|---|---|---|---|
| CN | 103971153 A | | 8/2014 | |
| CN | 107316075 A | | 11/2017 | |
| CN | 206691636 U | | 12/2017 | |
| CN | 206947503 U | * | 1/2018 | |
| CN | 206961156 U | | 2/2018 | |
| CN | 109780984 A | * | 5/2019 | |
| CN | 109997177 A | | 7/2019 | |
| EP | 2759975 A1 | | 7/2014 | |
| EP | 3190064 A1 | | 7/2017 | |
| ES | 2935482 T3 | * | 3/2023 | G06K 19/0724 |
| JP | 2008090831 A | | 4/2008 | |
| JP | 2018173812 A | | 11/2018 | |
| JP | 2019112135 A | * | 7/2019 | |
| TW | 201731745 A | | 9/2017 | |
| WO | 2018011536 A1 | | 1/2018 | |
| WO | 2019133347 A1 | | 7/2019 | |

OTHER PUBLICATIONS

IT Search report issued Jun. 17, 2020 re: Application No. 201900018992, pp. 1-8, citing: EP 2 759 975 A1.

Written Opinion issued Nov. 11, 2020 re: Application No. PCT/EP2020/078397, pp. 1-8, citing: EP 2 759 975 A1, CN 206 961 156 U, CN 206 691 636 U, CN 107 316 075 A, WO 2018/011536 A1, EP 3 190 064 A1, US 2016/063830 A1 and US 2015/242842 A1.

Japanese Office Action for Application No. 2022-523125, dated Apr. 4, 2024, 20 pages with translation.

Chinese Office Action for Application No. 202080072475.5, dated May 31, 2024, 18 pages with translation.

European Office Action for Application No. 20789582.2, dated Sep. 26, 2024, 13 pages.

* cited by examiner

SYSTEM AND COMPUTER PROGRAM FOR THE MANAGEMENT OF OBJECTS

TECHNICAL FIELD

The present disclosure relates to a system and a computer program for the management of objects.

The disclosure also relates to a container that can be used in such a system.

BACKGROUND

Objects for which an even considerable economic value is acknowledged are currently widespread worldwide.

This is, for example, the case of:
- objects for which there is a collecting interest, such as playing cards, picture cards, comics and/or items that belonged to celebrities,
- works of art,
- luxury objects, such as for example wine bottles.

Some of these items have a considerable economic value, which is determined by various factors, such as for example:
- rarity,
- integrity,
- the number and/or identity of previous owners,
- the quotation of such articles in previous trades.

Currently, however, it is not always possible, or in any case easy, to be able to establish the value of an object and/or obtain information related to the above cited factors.

SUMMARY

For a buyer, therefore, the need arises to have a tool that aids him in determining the value of the object of interest.

This need is felt even more due to the proliferation of counterfeit objects, fully similar to the original ones, which are custom-made by criminals and sold to victims at the price of the original objects.

The aim of the present disclosure is to provide a system and a computer program for the management of objects that are capable of improving the background art in one or more of the aspects indicated above.

Within this aim, the disclosure provides a system and a computer program for the management of objects that allow the user to establish univocally and immediately the value of an object.

The disclosure further provides a system and a computer program for the management of objects that are easy and quick to provide.

The present disclosure overcomes the drawbacks of the background art in a manner that is alternative to any existing solutions.

The disclosure also provides a system and a computer program for the management of objects that are highly reliable, relatively easy to provide and at competitive costs.

This aim, as well as these and other advantages which will become better apparent hereinafter, are achieved by providing a system for the management of at least one object, characterized in that it comprises:
- at least one container for containing said at least one object, said container having an element for the identification of said at least one object,
- a control element,
- an element for reading said identification element, connected and/or connectable to said control element,
- a data entry and/or updating interface which is connected and/or connectable to said control element.

This aim, as well as these and other objects which will become better apparent hereinafter, are also achieved by a computer program for the management of at least one object by means of a system, said program being installed and/or installable in a processor, said computer program being characterized in that it comprises the instructions for at least one of the following operations:
- receiving data entered and/or updated by means of an interface for the entry and/or updating of such data,
- storing said data in a memory unit,
- receiving requests of said data from a reading element,
- obtaining said data requested by said reading element in said memory unit,
- providing said requested data to said reading element.

BRIEF DESCRIPTION OF THE DRAWINGS

Further characteristics and advantages of the disclosure will become better apparent from the description of some preferred but not exclusive embodiments of a system and a computer program for the management of objects according to the disclosure, illustrated by way of non-limiting example in the accompanying drawings, wherein.

DETAILED DESCRIPTION OF THE DRAWINGS

Figure 1:
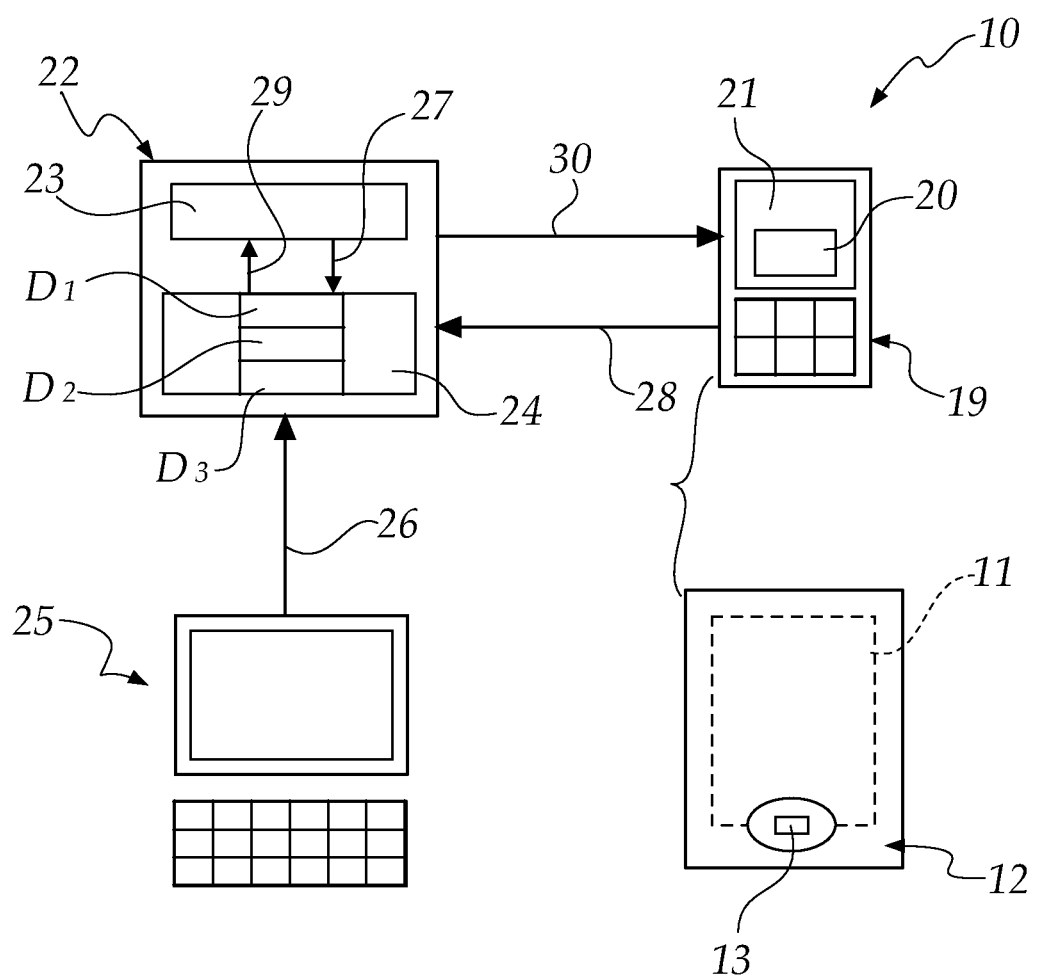
FIG. 1 is a view of a system for the management of objects according to the disclosure.

With reference to the figures, the system for the management of objects, according to the disclosure, is designated generally by the reference numeral 10.

The system 10 is adapted to manage one or more objects 11.

In the examples provided in the figures, the object 11 is a collection card; however, the object 11 may be any depending on the fields and sectors of interest.

The system 10 comprises one or more containers 12, each adapted to contain one or more objects 11.

In particular, the object 11 is contained and sealed within said container 12, such as for example a sleeve and/or a box.

The term "sealed", in the present description, means that the object 11 cannot be removed from the container 12 without breaking said container.

Figure 2:
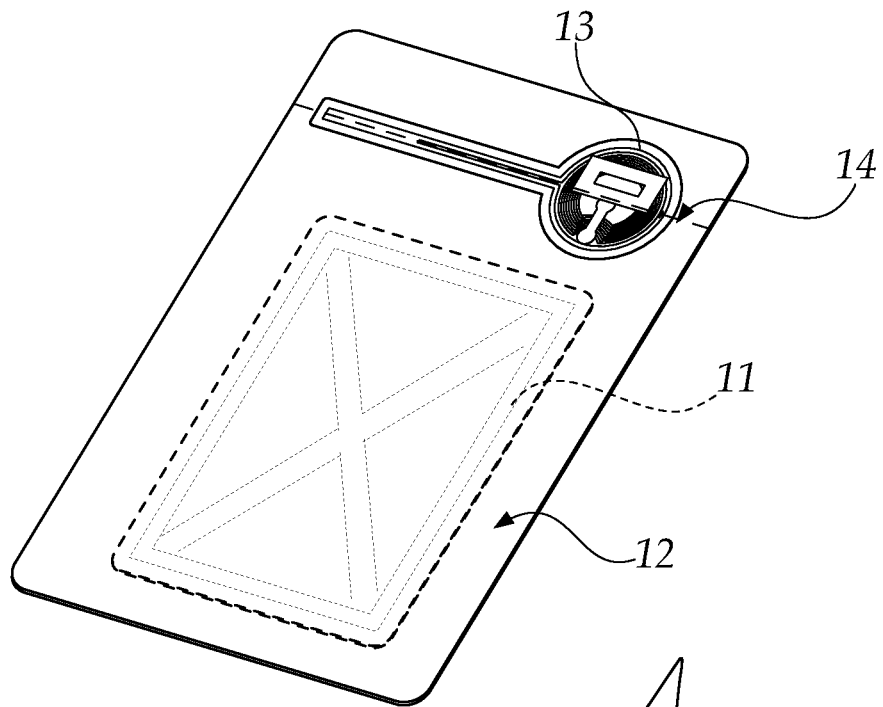
FIG. 2 is a view of a first embodiment of a component of the system for the management of objects, of FIG. 1.
Figure 3:
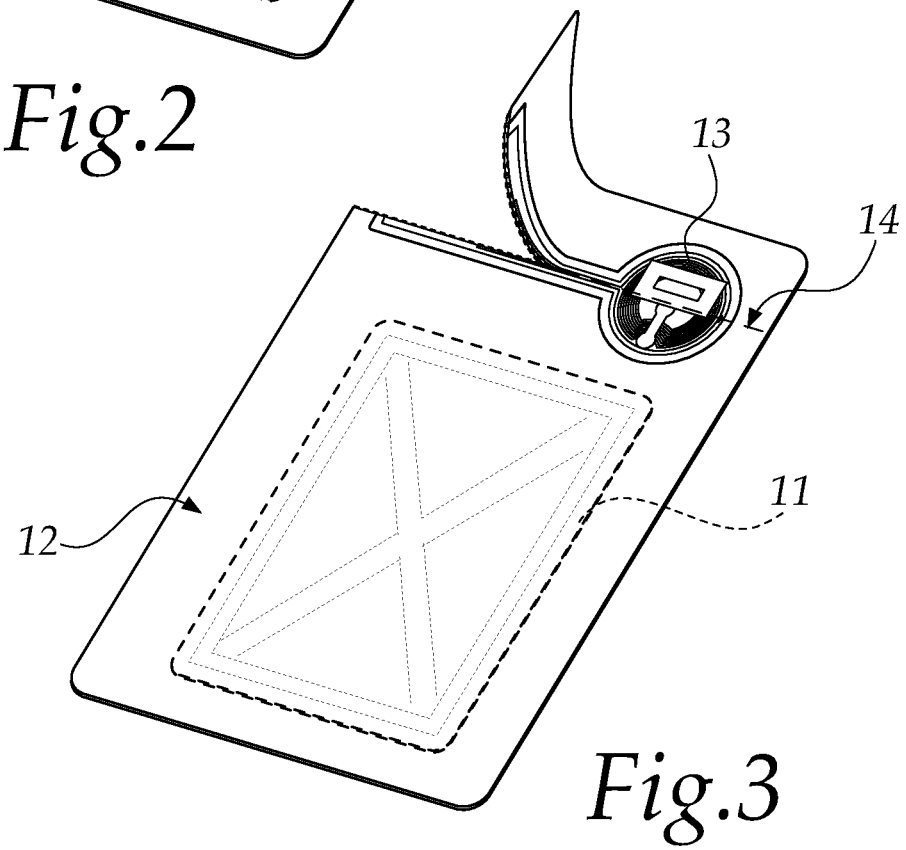
FIG. 3 is a view of the component of this system for the management of objects, of FIG. 2, in a different condition.

For example, with reference to FIGS. 2 and 3, in order to seal the object 11 inside the container 12 shaped like a sleeve, the object is inserted through its original opening inside the basic sleeve, constituted by two opposite flaps made of plastic material which are heat-sealed on three edges, and then said sleeve is closed by heat-sealing the two flaps along the last edge.

Figure 4:
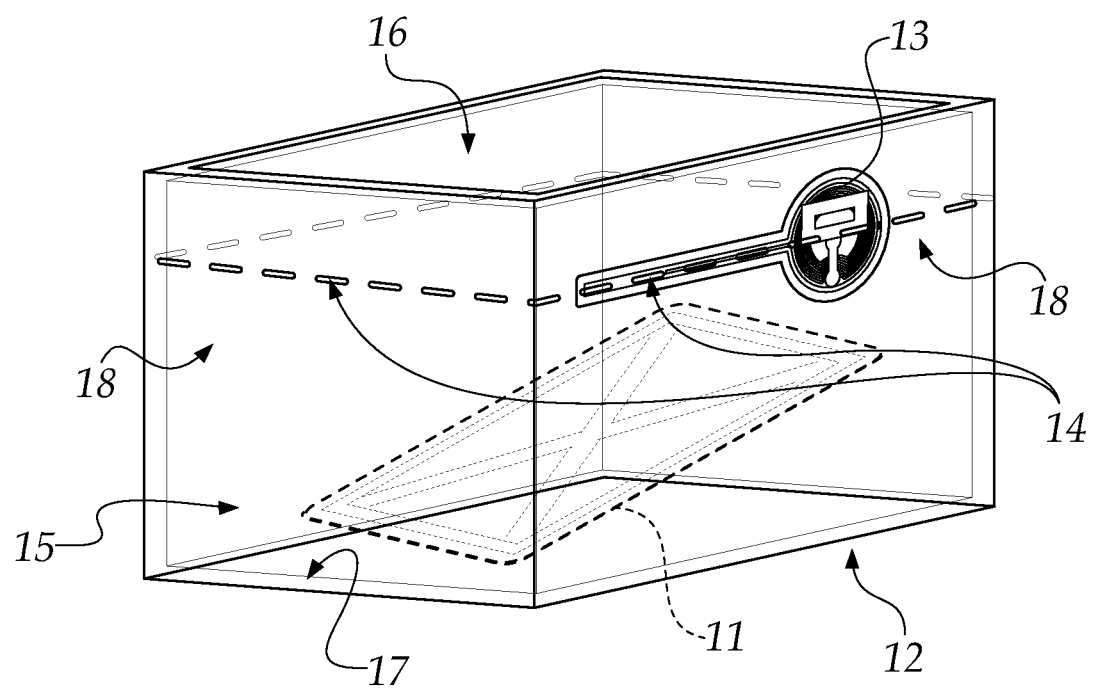
FIG. 4 is a view of a second embodiment of a component of the system for the management of objects, of FIG. 1.

In the case of the box-shaped container 12, shown in FIG. 4, for example, the object 11 is inserted in a tray 15, which is constituted by a base 17 and four side walls 18 and then the tray 15 is closed by heat-sealing to the side walls 18, along the edges that are opposite the ones that are integral with the base 17, a cover element 16.

The container 12 is made for example of plastic material that is at least partially transparent and/or glass.

In particular, the container 12 is provided with an element 13 for the identification of the object 11 or objects 11 contained therein.

The identification element 13 is for example a label which bears a bar code and/or a QR code (Quick Response code) and/or an RFID (Radio-Frequency IDentification) tag and/or an NFC (Near-Field Communication) tag, and/or the like.

In a preferred but not exclusive embodiment of the disclosure, the identification element 13 is a dual frequency NFC tag.

In particular, the dual frequency of this NFC tag comprises:
- a first operating frequency, of the high-frequency (HF) type,
- a second operating frequency, of the ultrahigh frequency (UHF) type.

For example, the first frequency is on the order of 13 MHz while the second frequency is comprised between 860 MHz and 960 MHz.

Furthermore, this NFC tag has a rectangular profile, with a dimension of the sides substantially comprised between 30 mm and 60 mm.

Such an NFC tag is, for example, the one known by the trade name WEB DF, EM4423 of the Dutch company Smartrac.

The dual frequency of the tag is advantageous as one of the two frequencies is used for the management of the identification element 13 while the other one is used for communication with the reading element 19 described below and for operation by means of an app.

The container 12 has a preweakening 14 and the identification element 13 is arranged thereat and/or astride it.

Specifically, the identification element 13 is arranged at the preweakening 14 so that it is not possible to break/open the container 12 without breaking irreparably the identification element 13, as shown in FIG. 3.

The expression "breaking irreparably" in the present description is understood to mean that once the identification element 13 has been broken, it is no longer capable of providing the data D1, D2, D3 of the content of the container 12, even if it is restored.

This occurs because, for example, the antenna of the NFC tag breaks and therefore the tag is no longer capable of transmitting data.

Such content data D1, D2, D3 refer to the object 11 arranged inside the container 12 (or the objects 11, if there is more than one) and provide information regarding for example:
- the rarity of said object 11,
- the integrity of said object 11,
- the number and/or identity of the previous owners of said object 11,
- the quotation of said object 11 in previous trades.

Such identification element 13 is firmly associated with the container 12.

The expression "firmly associated" in the present description is understood to mean that the identification element 13 is applied and/or fixed by virtue of nonremovable fixing means (such as adhesives) and/or embedded within the material of which the container 12 is made and it is not possible to remove it from the container without breaking it irreparably.

In this manner, the integrity of the identification element 13 ensures the authenticity of the content of the container 12 and the veracity of the data that can be deduced from it, since companies that manufacture the object 11 or other acknowledged certification entities provide and/or configure the container 12 and/or the identification element 13.

In the examples shown in the figures, the identification element 13 has an extension that corresponds only partially to the extension of the preweakening 14; however, in constructive variations of the container 12, not shown in the figures, the identification element 13 has an extension that is substantially equal to the extension of the preweakening 14: in the case of a box-shaped container, such as the one shown in FIG. 4, the identification element 13 can therefore be extended on four sides of the box, surrounding the object 11 completely.

In other constructive variations, not shown in the figures, the identification element 13 has an extension that is substantially equal to the perimetric edge of the container 12, without the presence of preweakenings 14.

For example, in the case of a sleeve, the identification element 13 has an antenna that is extended substantially along its entire perimetric edge, with a quadrangular profile. In this manner, any breakage and/or damage along the entire perimetric edge of the sleeve breaks irreparably the identification element 13.

The identification element 13 is univocally correlated to the content of the container 12 to which it is applied, i.e., to the object 11 (or to the objects 11) inside the container 12.

In particular, the system 10 comprises at least one element 19 for reading said identification element 13.

The reading element 19 comprises:
- means 20 for reading the identification element 13, such as for example an optical reader and/or an RFID antenna and/or an NFC antenna,
- means 21 for displaying the data D1, D2, D3 associated with the identification element 13.

The reading element 19 is for example a smartphone and/or a tablet and/or a dedicated user interface.

The system 10 comprises a control element 22, such as for example a server, which in turn comprises:
- a processor 23 for the data D1, D2, D3, such as a CPU (central processing unit),
- a memory unit 24 for the data D1, D2, D3.

The system 10 comprises an interface 25 for the entry and/or updating of data D1, D2, D3 in the control element 22.

The interface 25 for the entry and/or updating of data D1, D2, D3 is for example a computer and/or a tablet and/or a dedicated computer.

The interface 25 for the entry and/or updating of data D1, D2, D3 can be:
- directly connected to the control element 22 by means of a physical connection, for example an electrical connection,
- remotely connected to the control element 22, for example in the cloud, by means of a Wi-Fi (Wireless Fidelity) and/or Bluetooth link.

A dedicated computer program or software for managing the data D1, D2, D3 is installed and/or installable in the processor 23 of data D1, D2, D3.

In the continuation of the description, said computer program will be referenced by the term "software".

The software is suitable to:
- receive the data D1, D2, D3 entered and/or updated by means of the interface 25 (arrow 26),
- store the data D1, D2, D3 in the memory unit 24 (arrow 27),
- receive requests for data D1, D2, D3 from the reading element 19 (arrow 28), after the reading means 20 have decoded the identification element 13, obtain the data D1, D2, D3 requested by the reading element 19 in the memory unit 24 (arrow 29), provide the data D1, D2, D3 to the reading element 19 (arrow 30).

Once the data D1, D2, D3 have been received, the display element 19 shows said data to the user by virtue of the display means 21.

The reading element 19 can be:

connected directly to the control element 22 by means of a physical connection, for example an electrical connection, remotely connected to the control element 22 by means of a Wi-Fi or and/or Bluetooth connection.

The software that is present in the processor 23 can also manage the trading of objects 11.

In this case, the buyer can make the purchase by entering the data for example associated with his identity and with the quotation of the transaction, by means of an interface 25.

The data D1, D2, D3 are therefore updated automatically by the processor 23 by means of the software contained in the control element 22.

In particular, said software comprises the instructions for controlling the operation of the system 10.

The instructions contained in the software control the processor 23 to perform the following steps in sequence:

reception of the univocal code comprised in the identification element 13 read by the reading means 20;

selective and automatic extraction from the memory unit 24 of one or more data items D1, D2, D3 related to an item of information linked to the object 11 associated with the received univocal code;

automatic sending of these one or more data D1, D2, D3 to the display means 21.

The instructions contained in the software 23 furthermore control the processor 23 to perform the following steps:

management of the purchase of at least one object of interest 11 by a buyer user after entering the data of his identity by means of the interface 25;

automatic adding, upon the purchase of the object of interest 11, of the data of the identity of the buyer user to the data D1, D2, D3 contained in the memory unit 24, so that upon the reading of the identification element 13 that comprises the code univocally associated with the latter, the display means 21 show the identity of the buyer as the last owner or first owner of the object 11.

It should be noted that with the disclosure it is possible to rapidly and simply obtain information related to an object of value, contained in a sealed container that maintains its integrity, by moving a reading element 19 closer to the identification element 13.

This also allows to obtain information without having to open the container 12.

In practice it has been found that the disclosure achieves the proposed aims and objects, providing a system and a computer program for the management of objects that allow the user to establish univocally and immediately the value of an object.

The disclosure provides a system and a computer program for the management of objects that are easy and quick to provide.

The disclosure thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Applications No. 102019000018992, 102019000020442 and 102020000002728 from which this application claims priority are incorporated herein by reference.

The invention claimed is:

1. A system for the management of at least one collector's object, comprising:
   at least one container for containing said at least one collector's object, said container being made of plastic material that is at least partially transparent and/or glass, said container having an identification element for an identification of said at least one collector's object,
   a control element,
      a reading element for reading said identification element, connected and/or connectable to said control element, and
      an interface for entry and updating of data relating to the value of said collector's object, said data comprising the rarity of said collector's object, the integrity of said collector's object, the number and/or identity of the previous owners of said collector's object, and the quotation of said collector's object in previous trades, said interface being connected and/or connectable to said control element,
      said identification element being a dual frequency NFC tag comprising a first frequency used for the management of said identification element and a second frequency used for communication with said reading element.

2. The system according to claim 1, wherein said reading element comprises:
   means for reading said identification element, and
   means for displaying said data.

3. The system according to claim 2, wherein said means for reading said identification element is an NFC antenna.

4. The system according to claim 1, wherein said reading element is a smartphone and/or a tablet and/or a dedicated user interface.

5. The system according to claim 1, wherein said control element is a server comprising:
   a processor of said data, and
   a memory unit for said data.

6. The system according to claim 1, wherein said interface for the entry and/or updating of said data is a computer and/or a tablet and/or a dedicated computer.

7. The system according to claim 1, wherein said dual frequency of said dual frequency NFC tag comprises:
   a first operating frequency, of the high-frequency (HF) type, and
   a second operating frequency, of the ultrahigh frequency (UHF) type.

8. The system according to claim 7, wherein said first operating frequency is on the order of 13 MHz and said second operating frequency is comprised between 860 MHz and 960 MHz.

9. The system according to claim 1, wherein said dual frequency NFC tag has a quadrangular profile, with a dimension of the sides comprised between 30 mm and 60 mm.

10. A container for said system for management of collector's objects according to claim 1, said container containing said at least one collector's object and having said identification element of said at least one collector's object, wherein said container is sealed, and wherein said identification element is said dual frequency NFC tag.

11. The container according to claim 10, wherein said identification element is a label which bears said dual frequency NFC tag.

12. The container according to claim 10, further comprising a preweakening and wherein said identification element is arranged thereat and/or astride said preweakening.

13. The container according to claim 10, wherein said identification element is arranged so that it is not possible to break/open said container without breaking irreparably said identification element.

14. The container according to claim 10, wherein said identification element is firmly associated with said container.

15. The container according to claim 10, wherein said identification element is correlated univocally to a content of said container.

16. A non-transitory computer readable medium having a computer program for dedicated management of said at least one collector's object by a system according to claim 1, said computer program being installed in said processor, said computer program comprising instructions for at least one of the following operations:
   receiving said data entered and/or updated by said interface for the entry and/or updating of said data,
   storing said data in said memory unit,
   receiving requests for said data from said reading element,
   obtaining said data from said reading element in said memory unit, and
   providing said requested data to said reading element.

17. The non-transitory computer readable medium according to claim 16, said computer program further comprising instructions for performing the following steps in sequence:
   receiving a univocal code comprised in said identification element read by said reading means,
   extracting selectively and automatically from said memory unit one or more data items which relate to an item of information linked to said at least one collector's object associated with said received univocal code, and
   automatically sending said one or more data to said display means.

18. The non-transitory computer readable medium according to claim 16, said computer program further comprising instructions for performing the following steps:
   managing a purchase of said at least one collector's object by a buyer user after the entry of data of his own identity by said interface, and
   adding automatically upon the purchase of said at least one collector's object said data of the identity of a buyer user to said data contained in said memory unit, so that upon reading said identification element that comprises said univocal code associated with the latter said display means show the identity of said buyer user as the last owner and/or the first owner of said at least one collector's object.

\* \* \* \* \*